(12) United States Patent
Travaglini

(10) Patent No.: US 10,435,096 B2
(45) Date of Patent: Oct. 8, 2019

(54) PULLING TOOL FOR HUMAN POWERED CYCLING VEHICLES

(71) Applicant: Antonio Travaglini, Laval (CA)

(72) Inventor: Antonio Travaglini, Laval (CA)

( * ) Notice: Subject to any disclaimer, the term of this patent is extended or adjusted under 35 U.S.C. 154(b) by 93 days.

(21) Appl. No.: 15/678,133

(22) Filed: Aug. 16, 2017

(65) Prior Publication Data

US 2018/0050749 A1 Feb. 22, 2018

(30) Foreign Application Priority Data

Aug. 16, 2016 (GB) .................................. 1614001.4

(51) Int. Cl.
| | | |
|---|---|---|
| *B62H 7/00* | (2006.01) | |
| *B62B 9/20* | (2006.01) | |
| *B62J 99/00* | (2009.01) | |
| *B62K 9/02* | (2006.01) | |

(52) U.S. Cl.
CPC .................. *B62H 7/00* (2013.01); *B62B 9/20* (2013.01); *B62J 99/00* (2013.01); *B62K 9/02* (2013.01)

(58) Field of Classification Search
CPC . B62H 7/00; B62B 9/20; B62B 5/0079; B62J 99/00; B62K 9/02
USPC .... 280/288.4, 292, 293; D12/112, 114, 162; 224/409, 412
See application file for complete search history.

(56) References Cited

U.S. PATENT DOCUMENTS

| | | | |
|---|---|---|---|
| 656,998 A * | 8/1900 | McDonald et al. ... | B62K 27/12 280/292 |
| 667,154 A * | 1/1901 | McDonald et al. ... | B62K 27/12 280/292 |
| 1,198,001 A * | 9/1916 | Best ........................ | B62K 9/02 280/7.1 |
| 2,595,597 A | 5/1952 | Morseth | |
| 3,130,444 A | 4/1964 | Stollsteimer | |
| 4,445,704 A | 5/1984 | Troxler | |
| 4,736,963 A * | 4/1988 | Bettencourt .......... | B60D 1/167 280/292 |
| D329,831 S * | 9/1992 | Chambless .................. | D12/114 |
| 5,217,240 A | 6/1993 | Gardenbour, Jr. et al. | |
| 5,303,944 A | 4/1994 | Kalmus | |
| 5,431,364 A | 7/1995 | Etter | |
| 5,531,494 A | 7/1996 | Singleton | |
| D380,423 S | 7/1997 | Martelacci et al. | |
| 5,988,663 A | 11/1999 | Starks | |
| 6,135,479 A | 10/2000 | Tibay et al. | |
| 6,149,178 A | 11/2000 | Bradbury et al. | |
| 6,349,949 B1 * | 2/2002 | Gorringe ................ | B62B 5/068 280/1.5 |

(Continued)

*Primary Examiner* — William V Gilbert
(74) *Attorney, Agent, or Firm* — Christopher Pilling

(57) ABSTRACT

A pulling tool for a human-powered wheeled vehicle comprising an arm member including a telescoping shaft member and a handle member; and a connecting member configured to releasably connect to a handlebar of the human-powered wheeled vehicle such that the training tool can be used to direct and control the human-powered wheeled vehicle allowing a rider to learn how to operate the human-powered wheeled vehicle, wherein the connecting member includes a shaft receiving member configured to receive the telescoping shaft member, the shaft receiving member connected to a rectangular support element configured to receive a pair of prong members.

7 Claims, 4 Drawing Sheets

(56) References Cited

U.S. PATENT DOCUMENTS 6,349,958 B1 * 2/2002 Gawlik .................... B62H 7/00
                                                  16/110.1
8,292,317 B1 * 10/2012 Winters .................. B62H 7/00
                                                  224/412

* cited by examiner

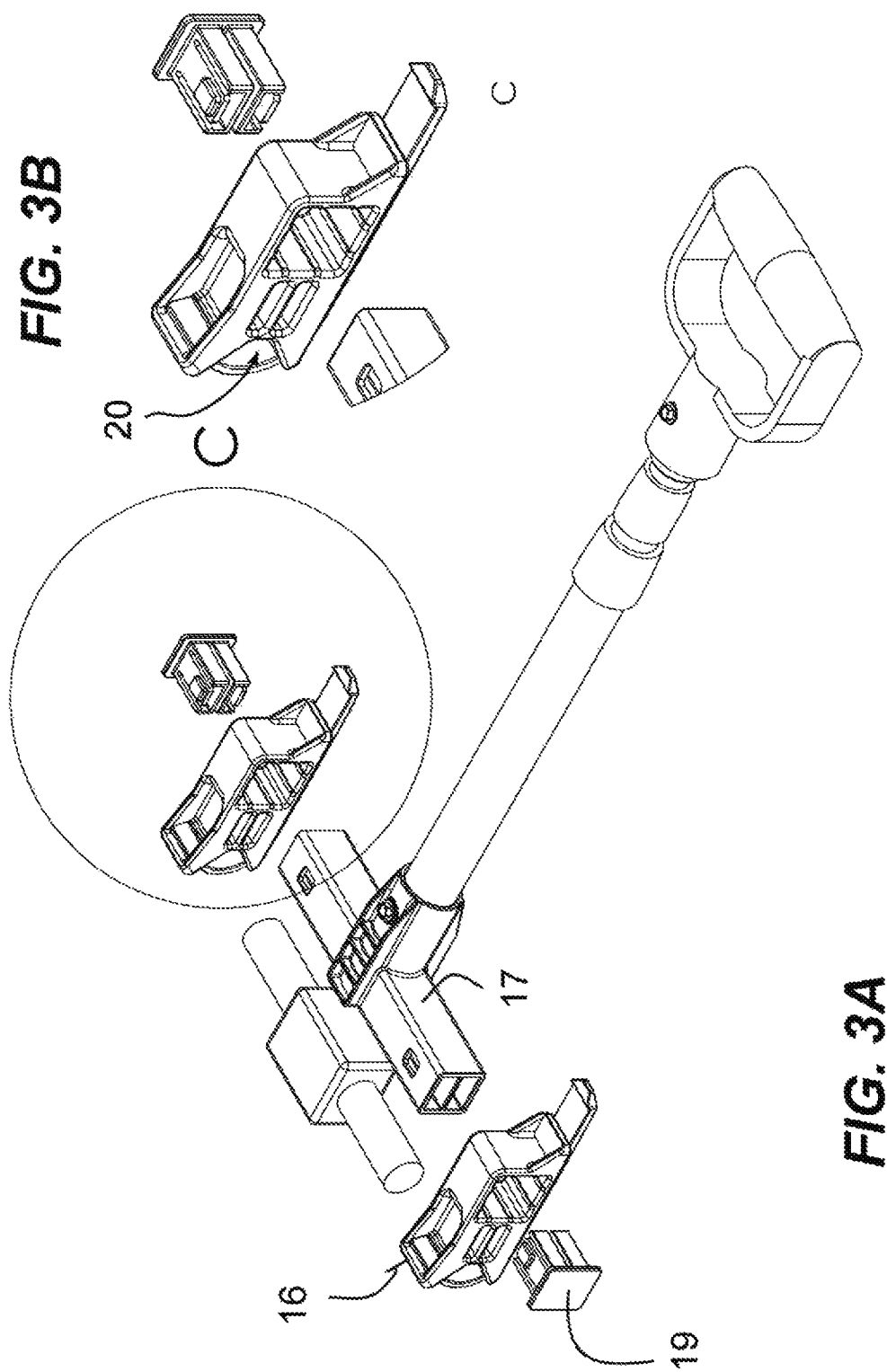

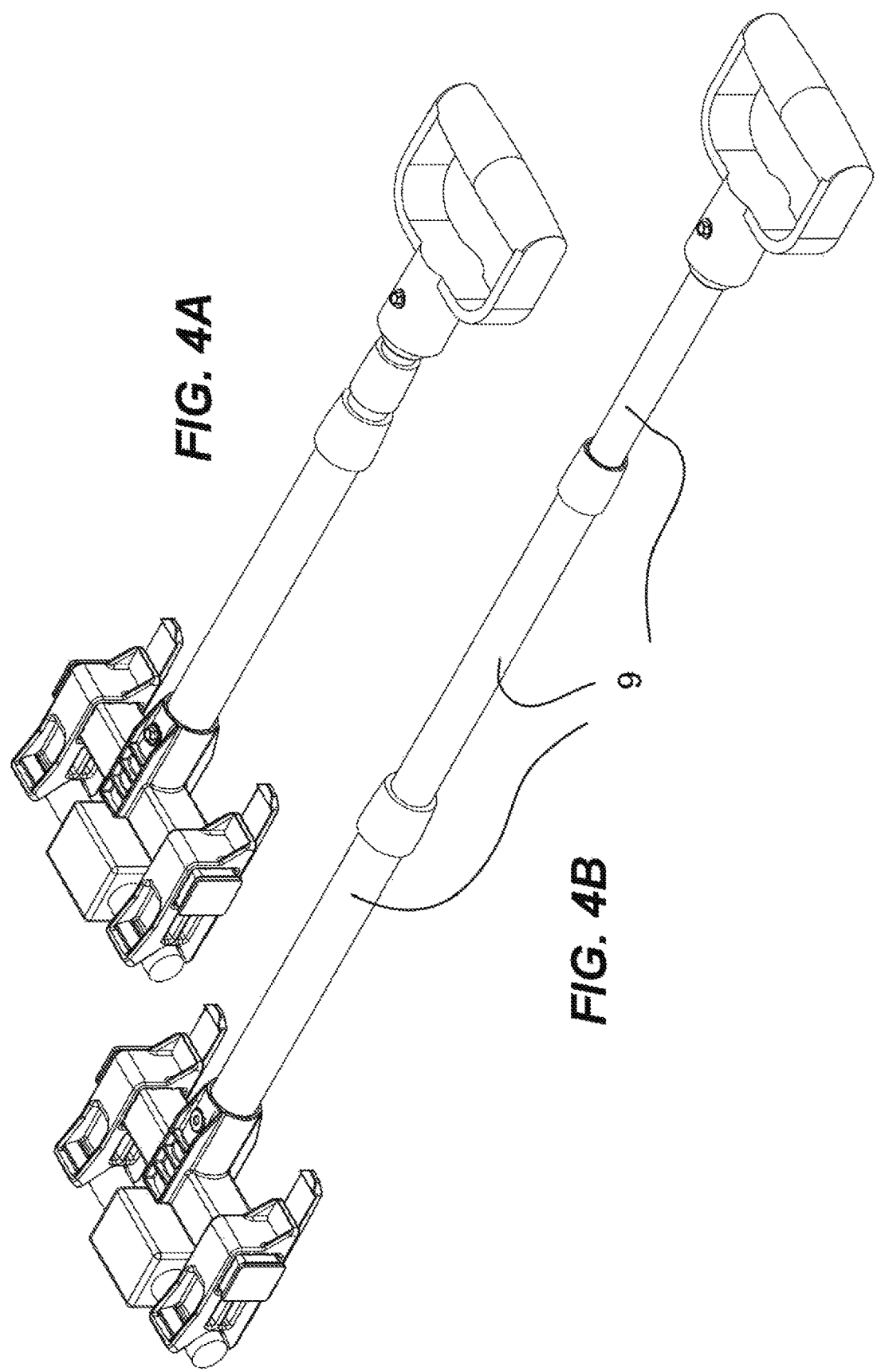

PULLING TOOL FOR HUMAN POWERED CYCLING VEHICLES

CROSS-REFERENCE TO RELATED APPLICATIONS

The present application claims priority to United Kingdom Patent Application serial number 1614001.4, filed on Aug. 16, 2016 entitled "Training tool for tricycle", the disclosure of which is hereby incorporated in its entirety at least by reference.

BACKGROUND OF THE INVENTION

1. Field of the Invention

The present invention relates generally to training tools but more particularly to a pulling and training tool for a human-powered wheeled vehicle.

2. Description of Related Art

It is well known that for a young child, it can take some time before they can make sense of the interaction between pedals, pedaling, and moving the wheels of a tricycle. The same goes with using the handle bar to turn the wheel and direct the tricycle in a given direction. It has been shown that pulling or pushing a tricycle helps the child understand the relationship between the motion of the tricycle and the motion of the pedals as well as understanding the action of the handle bar. Currently, there is a need for a training tool for a human-powered wheeled vehicle, such as a tricycle. Besides training children. The same tool can also be used for pulling when the child is tired of pedaling or too slow.

BRIEF SUMMARY OF THE INVENTION

In one embodiment of the present invention a pulling and training tool for a human-powered cycling or wheeled vehicle is provided, comprising an arm member including a telescoping shaft member and a handle member; and a connecting member configured to releasably connect to a handlebar of the human-powered wheeled vehicle such that the pulling tool can be used for pulling and controlling the human-powered wheeled vehicle allowing a rider to learn how to operate the human-powered wheeled vehicle, wherein the connecting member includes a shaft receiving member configured to receive the telescoping shaft member, the shaft receiving member connected to a rectangular support element configured to receive a pair of prong members.

In one embodiment, the pair of prong members is attached to a first and a second distal end of the rectangular support element. In another embodiment, a pair of end caps configured to secure the pair of prong members to the rectangular support element is provided. In one embodiment, each prong member of the pair of prong members has a cradle formed at its distal end, wherein the cradle is configured to receive the handlebar. In another embodiment, a pair of stretchable straps configured to secure the handlebar into the cradle is provided, wherein each strap of the pair of stretchable straps is fixedly attached to a bottom portion of each prong member of the pair of prong members. In yet another embodiment, each strap of the pair of stretchable straps are secured in each prong member of the pair of prong members via a peg inserted in an elongated slot positioned on a top portion of each prong member. In one embodiment, the telescoping shaft member is configured to be transferable from a retracted position to a protracted position when the plurality of shaft sections is expanded.

In one embodiment, the telescoping shaft member includes a plurality of shaft sections. In one embodiment, the human-powered wheeled vehicle is a tricycle.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 3A is an exploded view of the pulling tool for a human-powered wheeled vehicle according to an embodiment of the present invention.

FIG. 3B is a detailed view of detail C of FIG. 3A.

FIG. 4A showing a telescoping shaft member of the pulling tool in a retracted position according to an embodiment of the present invention.

FIG. 4B showing the telescoping shaft member of the pulling tool in a protracted position according to an embodiment of the present invention.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a pulling tool for a human-powered wheeled vehicle.

Figure 1:
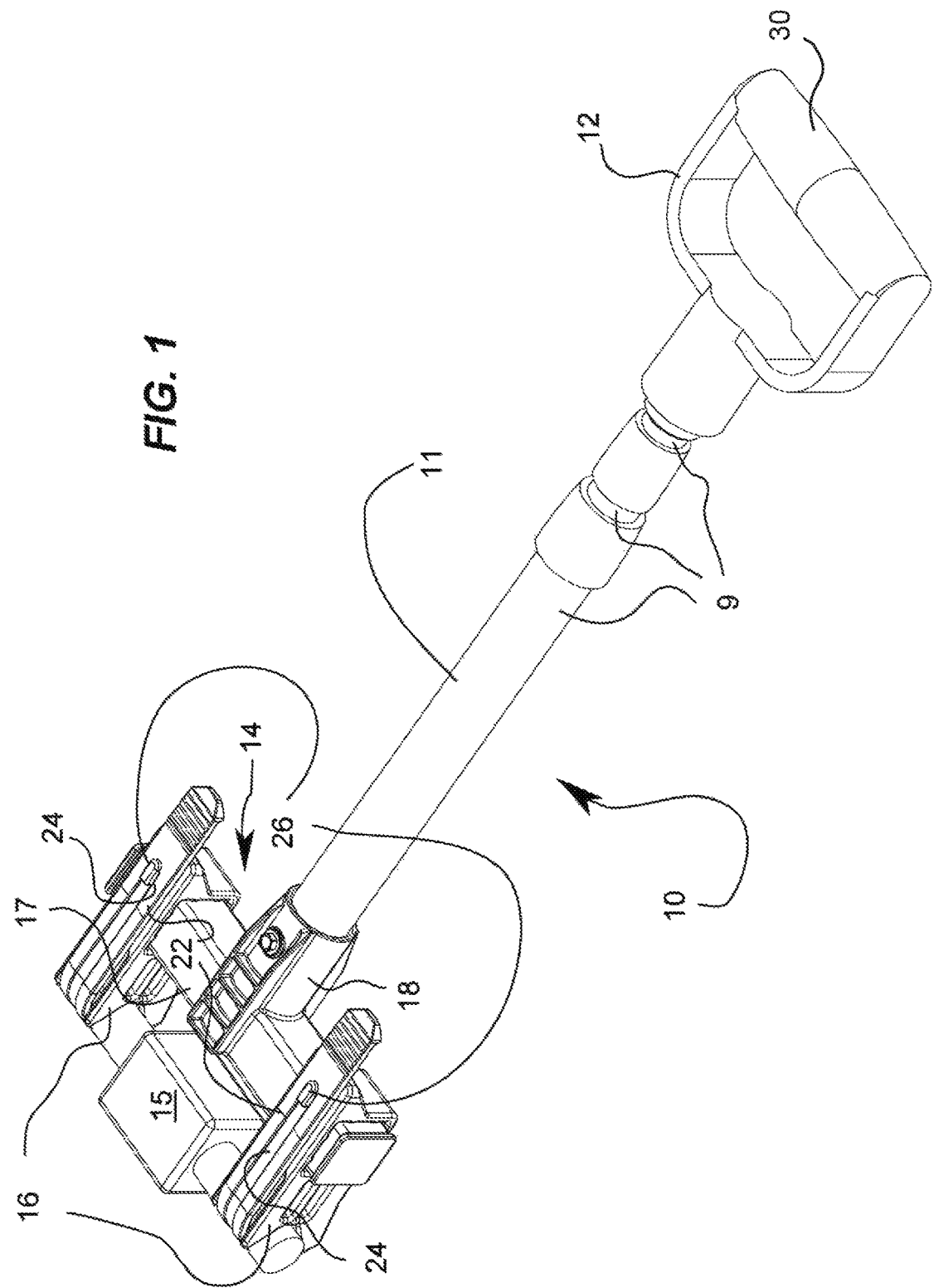
FIG. 1 is a pulling tool for a human-powered wheeled vehicle according to an embodiment of the present invention.
Figure 2A:
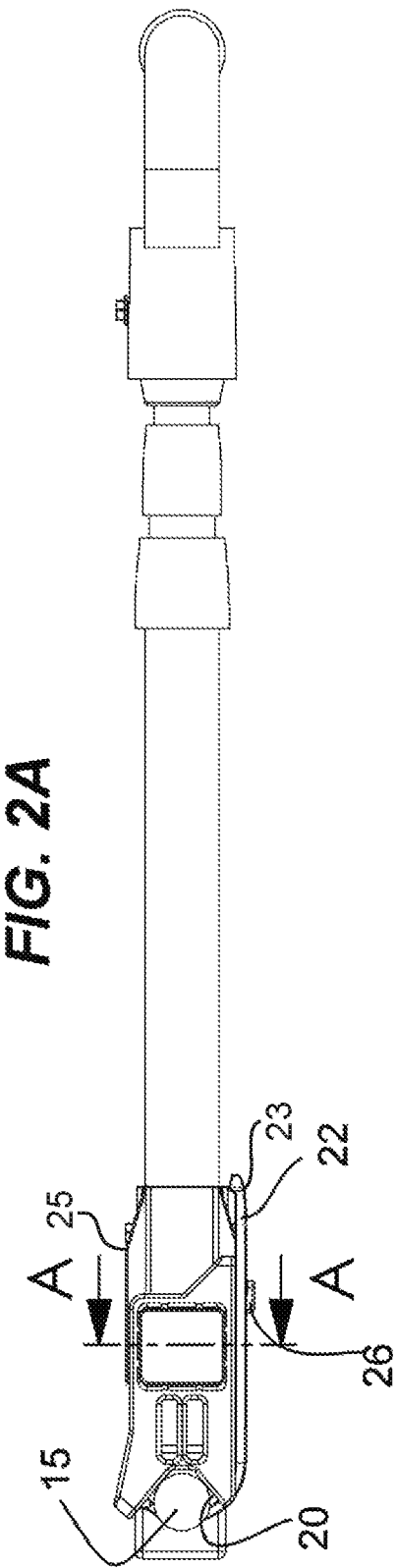
FIG. 2A is a side view of the pulling tool for a human-powered wheeled vehicle according to an embodiment of the present invention.
Figure 2C:
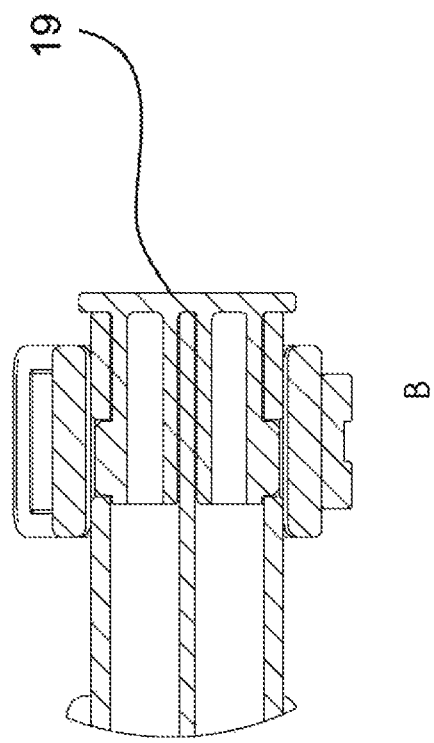
FIG. 2C is a detailed view of detail B of FIG. 2B.
Figure 2B:
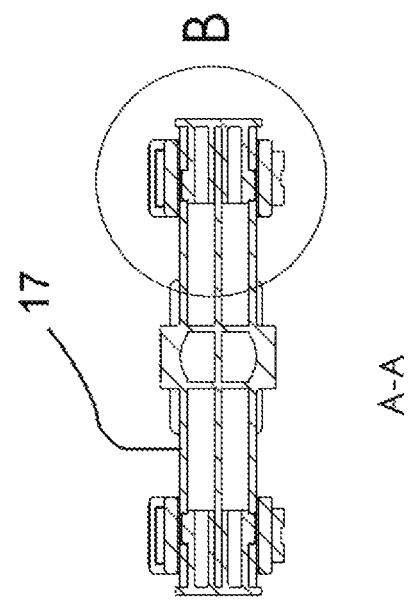
FIG. 2B is a cross-sectional view taken along section line A-A of FIG. 2A.

Referring now to any of the accompanying figures FIGS. 1-4B, a pulling tool for a human-powered wheeled vehicle is illustrated. The pulling tool comprises an arm member 10 and a connecting member 14 configured to be connected to handlebars 15 of a human-powered wheeled vehicle (not illustrated). The arm member includes a telescoping shaft member 11 and a handle member 12. In one embodiment, the handle member is attached to one end of the telescoping shaft member, and the other end attaches to a shaft receiving member 18 of the connecting member.

In one embodiment, the connecting member further includes a rectangular support element 17 having a pair of prong members 16, wherein the prong members are attached to the distal ends of the rectangular support element. A pair of end caps 19 is configured to secure the pair of prong members to the rectangular support element. In one embodiment, the pair of end caps are sized and shaped to fit the distal ends of the rectangular support element. In one embodiment each prong member of the pair of prong members has a cradle 20 formed at its distal end, wherein the cradle is configured to receive a handlebar 15, such as a tricycle handlebar.

In one embodiment, a strap 22 in each prong member secures the handle bar in the cradle. In one embodiment, the straps are stretchable, and fixedly attached to a bottom portion 23 of each prong member. In one embodiment, the straps are secured in each prong member via a peg 26 inserted in elongated slot 24. Best seen in FIG. 1 and FIG. 2A, the straps wrap around each prong member and specifically each cradle, wherein the straps are fixedly attached to the bottom portion and releasably attached at a top portion 25 via the peg as previously described.

Now referring to FIGS. 4A-B, the telescoping shaft member includes a plurality of shaft sections 9 to extend the length of the shaft member as well known in the art. In the preferred embodiment, there are three shaft sections but there could be more or less shaft section depending on the preferred length desired of the shaft member. FIG. 4A shows the telescoping shaft member in a retracted position where as FIG. 4B shows the telescoping shaft member in a protracted position.

During operation, the pulling tool attaches the handlebars of a human-powered wheeled vehicle, such as a tricycle such that when a child rides the vehicle a trainer can hold of the handle member of the arm member can direct the vehicle allowing the child to feel in control creating a bio-feedback reaction helping the child learn to ride the vehicle faster. Also, it is a particular advantage of the invention that the pulling tool allowing the child to feel safe and secure known the trainer, such as a parent is there to guide them. Further, the pulling tool can be used in situation when the child is tired of pedaling or is pedaling too slow.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A pulling tool for a human powered wheeled vehicle comprising:

an arm member including a telescoping shaft member and a handle member, wherein the handle member has a grip portion configured to receive a trainer's hand; and a connecting member configured to releasably connect to a handlebar of the human powered wheeled vehicle such that the pulling tool by way of the cylindrical grip portion operated by the trainer's hand is used to direct and control the human powered wheeled vehicle allowing a rider to be pulled creating a bio-feedback reaction aiding the rider to learn how to operate the human powered wheeled vehicle, wherein the connecting member includes a shaft receiving member configured to receive the telescoping shaft member, the shaft receiving member connected to a rectangular support element configured to receive a pair of prong members, the pair of prong members each having a distal end and a proximal end, the proximal end being proximal with respect to the rectangular support element and having an aperture receiving the rectangular support element, wherein the pair of prong members include a cradle formed at the distal end, the distal end being distal with respect to the rectangular support element, wherein the cradle is defined by an opening facing a direction opposite the proximal end and is configured to receive the handlebar;

a pair of straps each having a fixed end and a releasable end, wherein the fixed end is attached to a portion of the pair of prong members and the releasable end Is configured to secure and engage the handlebar by wrapping around the cradle.

2. The pulling tool of claim 1, wherein the pair of prong members is attached to a first and a second distal end of the rectangular support element.

3. The pulling tool of claim 2, further comprising a pair of end caps configured to secure the pair of prong members to the rectangular support element.

4. The pulling tool of claim 1, wherein each strap of the pair of straps includes an elongated slot and the releasable end of the pair of straps is configured to be secured to a top portion of the pair of prong members via a peg inserted in the elongated slot.

5. The pulling tool of claim 1, wherein the telescoping shaft member includes a plurality of shaft sections.

6. The pulling tool of claim 5, wherein the telescoping shaft member is configured to be transferable from a retracted position to a protracted position when the plurality of shaft sections is expanded.

7. The pulling tool of claim 1, wherein the human-powered wheeled vehicle is a tricycle.

* * * * *